United States Patent [19]

Barnabe et al.

[11] Patent Number: 5,205,790
[45] Date of Patent: Apr. 27, 1993

[54] STEERING-WHEEL SHAFT FORMING AN ANTI-THEFT LOCK ELEMENT

[75] Inventors: Jean-Pierre Barnabe; André Hoblingre; Nicolas Lapalu; Ghislain Passebecq, all of Valentigney, France

[73] Assignee: ECIA, France

[21] Appl. No.: 774,380

[22] Filed: Oct. 10, 1991

Related U.S. Application Data

[63] Continuation of Ser. No. 525,578, May 21, 1990, abandoned.

[30] Foreign Application Priority Data

May 22, 1989 [FR] France ................... 89 06655

[51] Int. Cl.⁵ ............................................. F16D 3/06
[52] U.S. Cl. ........................................ 464/162; 74/492
[58] Field of Search ............. 464/162, 179, 183, 134; 74/492; 70/252, 253

[56] References Cited

U.S. PATENT DOCUMENTS 1,268,866  6/1918  Moakler .................. 464/134 X
2,835,275  5/1958  Scholten .
3,613,412  10/1971  Yamaguchi .................. 70/252
4,738,154  4/1988  Hancock ..................... 70/252 X
4,854,141  8/1989  Haldric et al. ............... 70/252 X
4,884,423  12/1989  Fancher ...................... 70/252 X

FOREIGN PATENT DOCUMENTS 21766  3/1921  France .
2301318  9/1976  France .
2508860  6/1982  France .

Primary Examiner—Daniel P. Stodola
Attorney, Agent, or Firm—Sughrue, Mion, Zinn, Macpeak & Seas

[57] ABSTRACT

This steering-wheel shaft, having a cylindrical tubular body (1) with a circular cross-section, has a profiled part (8) forming a lock element. In this part (8), longitudinal grooves (10), having a width which corresponds to that of a locking catch, have a depth at least equal to the thickness of the wall of the initial tube and are separated by solid ribs (12). On the inner face of the element (8), projections define between them V-shaped grooves whose peaks correspond substantially to the mid part of the ribs. Each rib (12) thus has a sufficient resistance to counteract the torque exerted when a theft is attempted. Each groove can receive the catch in a locking position. The shaft has at least two grooves (10).

9 Claims, 3 Drawing Sheets

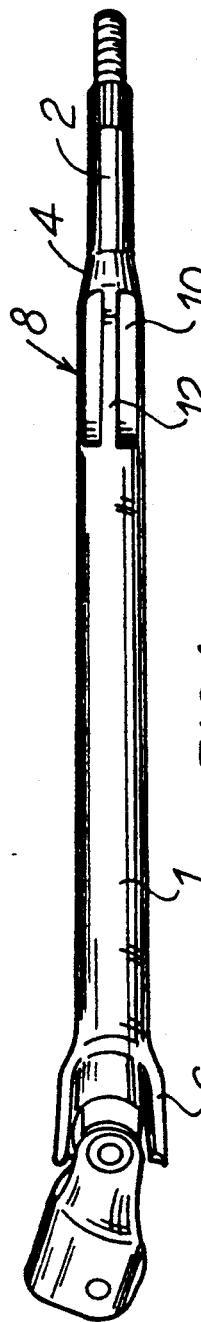
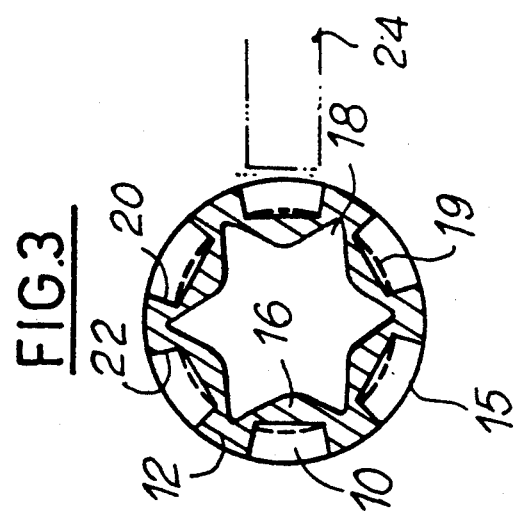
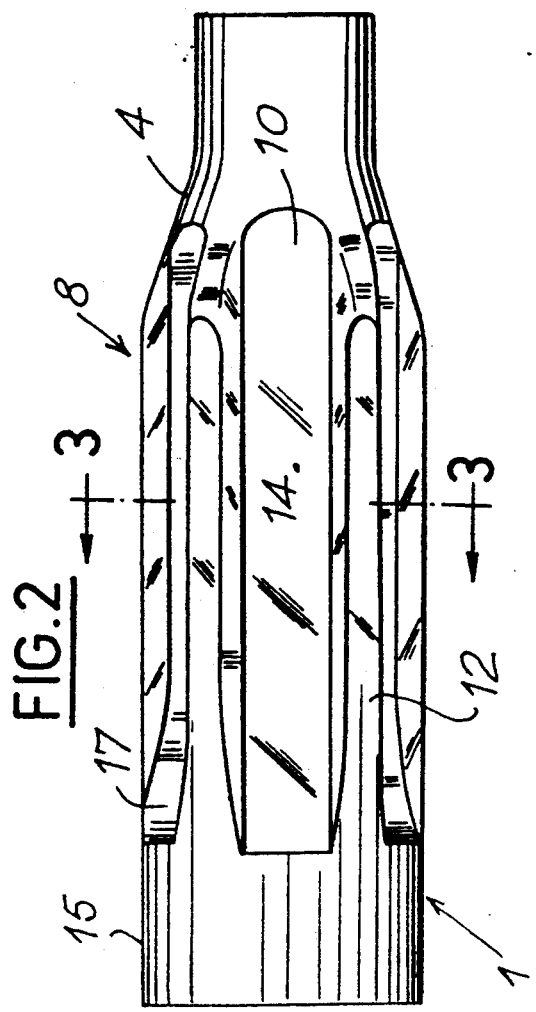

STEERING-WHEEL SHAFT FORMING AN ANTI-THEFT LOCK ELEMENT

This is a continuation of application Ser. No. 07/525,578, filed May 21, 1990, now abandoned.

BACKGROUND OF THE INVENTION

The most common anti-theft devices for a motor vehicle steering-wheel column have a lock which is fixed to the bodywork and the catch of which penetrates into a slot in the tube casing of the column, and into a slot in a sleeve integral with the steering-wheel shaft. When it is in this position, the catch therefore prevents any relative displacement of the column and of the steering-wheel shaft, in other words prevents the vehicle from being driven.

The presence of the sleeve and the need for it to be fixed to the steering-wheel shaft, however, complicates the production of the steering column. Devices are therefore increasingly being used in which the catch is locked in a slot made in the steering-wheel shaft itself. Unfortunately, in this case it is only possible for a limited number of locking positions to be available since it is impossible to increase the number of slots without reducing the resistance of the anti-theft device, and this resistance must be sufficient to overcome the torque exerted on the device, by way of the steering wheel, when a theft is attempted.

Now it is increasingly desired to be able to ensure the locking of the steering column in multiple angular positions without having to turn the wheel a long way in order to activate the catch.

SUMMARY OF THE INVENTION

The object of the present invention is to meet this requirement whilst preserving the advantages of the direct locking on the steering-wheel shaft.

To this end, the subject of this invention is a steering-wheel shaft having a cylindrical tubular body, with a circular cross-section, which has a profiled part forming, in its outside face, longitudinal locking grooves having a depth at least equal to the wall thickness of the tubular body and, moreover, in its inner face, regularly spaced longitudinal projections.

According to another feature, the locking grooves are separated on the outside face of the steering-wheel shaft by solid ribs having a thickness substantially equal to the wall thickness of the tubular body.

According to a preferred embodiment, the ribs have lateral faces which converge towards the inside of the tube and form between them an angle greater than the angle at the centre corresponding to the rib.

The shape and the dimension of the longitudinal grooves correspond to those of the catch of the lock, whereas each solid rib forms a lock element capable of resisting a substantial torque when any theft is attempted. The longitudinal grooves and the ribs, being regularly distributed over the entire periphery of the steering-wheel shaft, determine a certain number of locking positions which are separated by relatively small angular distances.

The description below of an embodiment given by way of non-limiting example and shown in the attached drawings will further allow the advantages and features of the invention to emerge. In these drawings:

BRIEF DESCRIPTION OF THE DRAWINGS

FIG. 1 is a view in elevation of a steering-wheel shaft according to the invention.

FIG. 2 is a view on a larger scale of the locking part of the steering wheel shaft in FIG. 1.

FIG. 3 is a view in cross-section along the line 3—3 in FIG. 2.

DESCRIPTION OF PREFERRED EMBODIMENTS

Figure 5:
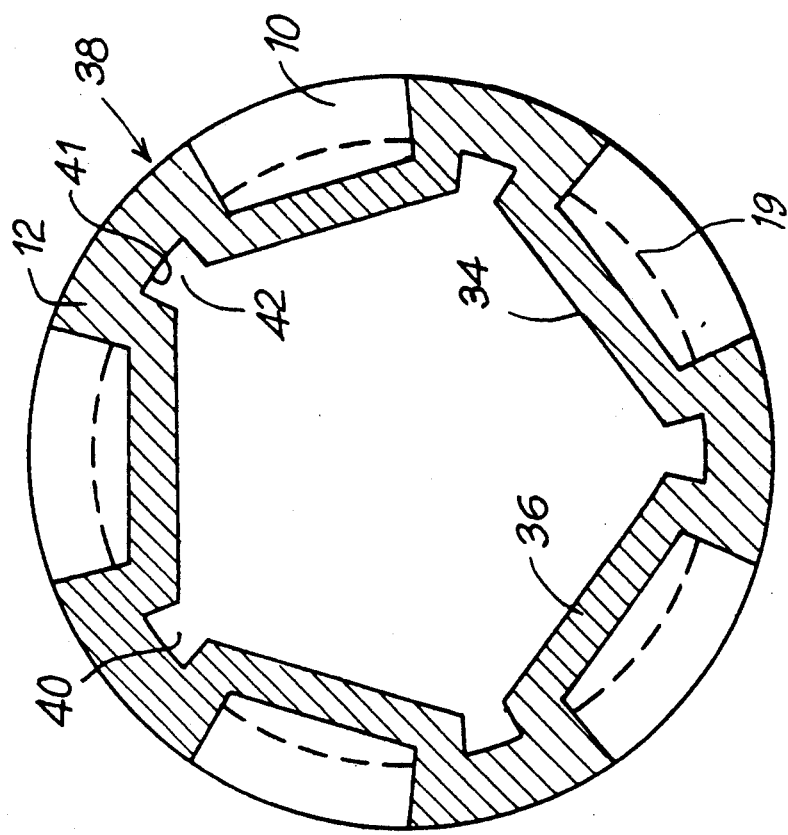
FIG. 5 is a view similar to FIG. 4 of another alternative embodiment.

The steering-wheel shaft shown in FIG. 1 has a cylindrical tubular body 1, with a circular cross-section, which is extended at one of its ends by a portion with a smaller diameter 2 forming a steering-wheel support. This steering-wheel support 2 is connected to the cylindrical body 1 by a tapered part 4. At its opposite end, the cylindrical body 1 is widened to form the arms of a universal-joint fork 6.

Over a portion of its length, preferably close to the tapered part 4, the cylindrical body 1 has a profiled part 8 forming a lock element. Indeed, a certain number of rectilinear longitudinal grooves 10 (FIGS. 2 and 3), whose depth corresponds at least to the wall thickness of the initial tube, that is to say of the tubular body 1, are formed in its outside face. The shape, or more exactly the width, of each of the grooves 10 corresponds to the shape of an anti-theft lock catch intended to interact with these grooves. The grooves 10 are separated from each other by ribs 12 which are solid over the entire depth of the grooves 10, in other words over a height corresponding substantially to the thickness of the initial tube.

The bottoms 14 of the grooves 10 are connected to the outside face 15 of the cylindrical body 1 by tapered portions 17, whereas at their opposite end, in the embodiment shown, these bottoms 14 extend rectilinearly into the tapered portion 4.

The inner face of the profiled tube 8 has a series of projections 16 which define between them grooves with a V-shaped cross-section 18, narrowing towards the outside. As shown more particularly in FIG. 3, each of the peaks of the V 18 is situated opposite the mid part of a rib 12, at a distance from the axis of the cylindrical body 1 which is substantially equal to the radius of the inner face 19 of this cylindrical body.

Figure 4:
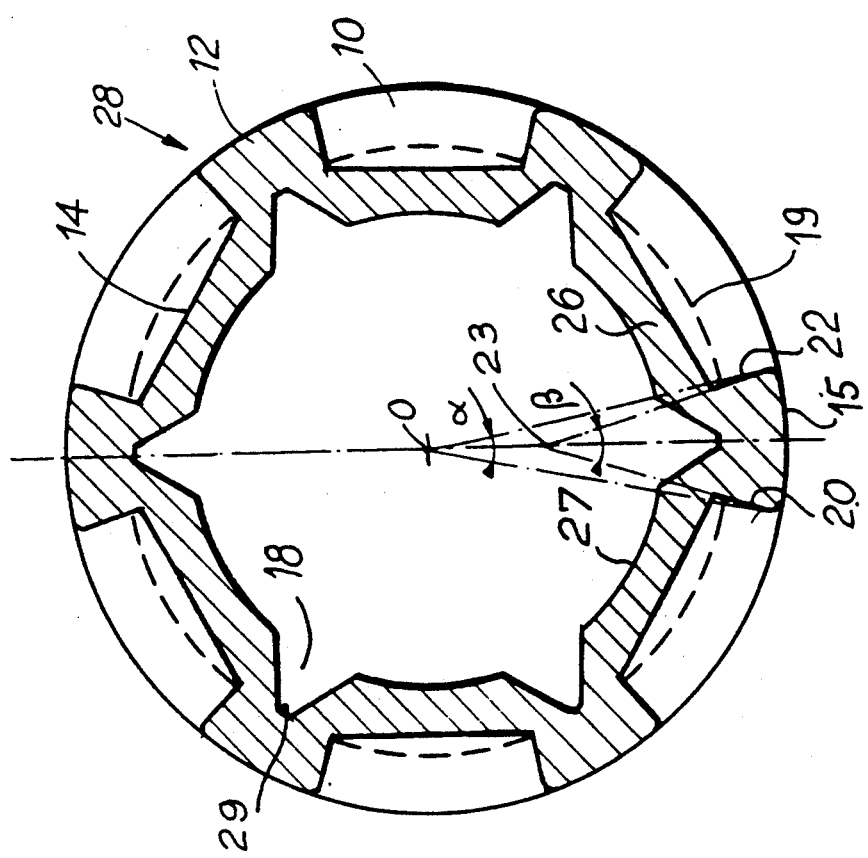
FIG. 4 is a view in cross-section, on a larger scale, of an alternative embodiment of the lock element.

Each of the ribs 12 is preferably limited by two lateral faces 20, 22 which converge in the direction of the inside of the tube towards an axis 23 situated inside the angle at the centre $\alpha$ corresponding to the rib itself (FIG. 4). Each of these lateral faces is thus set back towards the inside relative to the corresponding radius of the outside face 15 of the cylindrical body and the faces 20, 22 form between them an angle $\beta$ greater than this angle at the centre. This inclination of the lateral faces 20 and 22 facilitates the contact between the catch of the lock and the corresponding rib 12, and consequently the locking between these two elements, in particular when a rotational torque is applied to the shaft. The resistance of the steering-wheel shaft to the torque exerted when a theft is attempted is thus increased.

The profiled part 8 naturally has grooves 10 and ribs 12 which alternate over its entire periphery such that the steering-wheel shaft has available a corresponding number of regularly spaced locking positions. It may, for example, as shown in FIG. 3, have six grooves 10, in other words six locking positions. However, this number may vary as a function of the dimension of the catch and/or of the diameter of the cylindrical body: It may be two to five or, on the other hand, be greater than six. The circumferential width of each rib 12, however, preserves a value sufficient to enable it to resist a substantial torque.

It is clearly evident that the lock element formed by the profiled part 8 may be situated at any point on the cylindrical body 1 so as to correspond to the position of the lock on the bodywork.

Figure 6:
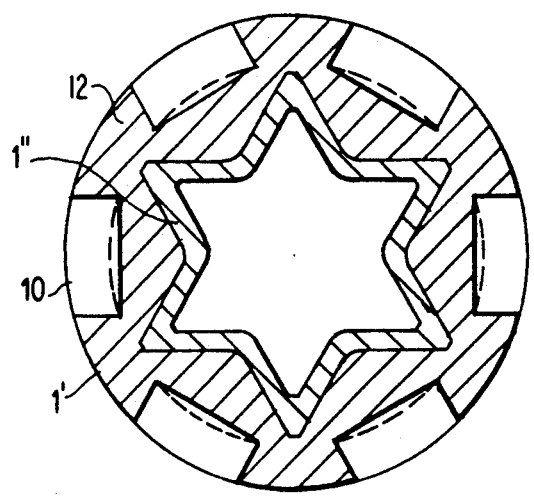
FIG. 6 is a view, similar to FIG. 3, of still another alternative embodiment.

Although the steering-wheel shaft shown in FIG. 1 is in a single piece, the invention also extends to include a steering-wheel shaft made in two shaft portions (half-shafts) and in particular a telescopic steering-wheel shaft as shown in FIG. 6. The outer half-shaft 1 then has the lock element 8, whereas the inner half-shaft 1 is shaped such that its outside face has a shape which complements that of the inner face of the profiled part or lock element 8. The inner half-shaft 1 may thus slide in this profiled part whilst at the same time being integral with it in rotation.

The lock elements shown in cross-section in FIGS. 4 and 5 are, in this case, very particularly adapted. Indeed, the lock element 28 in FIG. 4 has on its inside projections 26 whose peak is concave and forms a cylinder portion 27 coaxial with the body of the tube 1, in other words with the faces 15 and 19 of the latter. The projections as a whole thus define a substantially cylindrical volume. As in the embodiment in FIG. 3, the projections 26 are separated from each other by V-shaped grooves 18, narrowed towards the outside, whose peaks 29 are situated in the mid planes of the ribs 12. A steering-wheel half-shaft having a cylindrical outside general shape and fins narrowed towards the outside, six in the case shown, fits easily, by sliding, inside such a lock element.

According to another alternative embodiment shown in FIG. 5, the inner projections 36 of a lock element 38 have a flat inner face 34. The projections 36 thus define between them a prismatic volume, the base of which is a regular polygon, a pentagon in the case shown.

The projections 36 are, of course, separated by grooves 40 which are, like the grooves 18, symmetrical relative to the mid planes of the ribs 12. These grooves 40 are preferably splayed outwards, i.e., widen toward the outside of the tubular body 1 their bottom 41 being wider than the space 42 between the adjacent plane faces 34.

Such a lock element may easily receive a steering-wheel half-shaft with a general prismatic shape, whose shape and dimension correspond to those of the volume defined by the projections 36 and the grooves 40. It may, of course, also be formed on a single-piece steering-wheel shaft.

In all cases, the steering-wheel shaft may be locked by the introduction of a catch, such as that indicated at 24 in dot-dash lines in FIG. 3, into one of the grooves 10. It is clear that if, when it is desired to actuate the anti-theft device, the catch 24 is situated at least partially opposite a rib 12, a small turn of the steering wheel is sufficient to bring one of the neighbouring grooves 10 into a position facing this catch and thus to permit the complete locking. When a theft is attempted, in other words when a force is exerted on the steering wheel in order to try to make it turn, the rib 12 adjacent to the catch 24 is clamped on the latter and effectively resists the torque exerted on it. The particular shape of the lock element, or profiled part 8, formed without material removal, thus ensures that the locking has a high degree of resistance, and guarantees the safety of the vehicle.

What is claimed is:

1. A lockable steering-wheel shaft comprising a longitudinally-extending cylindrical hollow sleeveless tubular body (1) which has a circular cross-section and which has at a first end thereof an extension having a diameter smaller than that of said body and forming a steering-wheel support (2); said body and said steering wheel support being connected by a tapered body potion (4); wherein a wall of the body has a profiled part (8) forming, on the one hand, directly in the body's outside face and adjacent said tapered body portion (4) in a direction away from said first end, a plurality of longitudinal receiving and locking grooves (10) having inner bottoms (14) which are connected at first ends thereof to said outside face by tapered portions (17), and which have opposite second ends extending into said tapered body portion (4); and wherein said grooves (10) form a locking element for an anti-theft catch (24), are distributed over the body's entire circumference and have a radial depth at least equal to an initial wall thickness of the tubular body; said profiled part (8) forming, on the other hand, in the body's inside face, a plurality of regularly and circumferentially spaced longitudinal projections (16, 36) projecting radially inwardly.

2. Steering-wheel shaft according to claim 1, characterized in that it has, between the grooves (10), ribs (12) which are solid over a thickness substantially equal to said initial wall thickness.

3. Steering-wheel shaft according to claim 2, characterized in that the ribs (12) are defined by two lateral faces (20, 22) which converge in the direction of the inside of the body and form between them an angle $\beta$ greater than the angle $\alpha$ at the centre corresponding to the rib.

4. Steering-wheel shaft according to claim 2, characterized in that there are at least two to five grooves (10) and a same number of said ribs (12).

5. Steering-wheel shaft according to claim 1, characterized in that the projections (16, 28) are separated by grooves (18) narrowed towards the outside of the tubular body.

6. Steering-wheel shaft according to claim 1, characterized in that the projections (36) are separated by grooves (40) widened toward the outside of the tubular body.

7. Steering-wheel shaft according to claim 1, characterized in that said cylindrical body (1) forms a single piece with said steering-wheel support (2) and a universal-joint fork (6) at an opposite second end of said body (1).

8. Steering-wheel shaft according to claim 1, characterized in that the projections (26, 36) define a volume with a cylindrical or prismatic general shape.

9. A lockable steering-wheel shaft comprising a longitudinally-extending cylindrical hollow tubular body (1) which has a circular cross-section and which has at a first end thereof an extension having a diameter smaller than that of said body and forming a steering-wheel support (2); said body and said steering-wheel support being connected by a tapered body portion (4); wherein a wall of the body has a profiled part (8) forming, on the one hand, directly in the body's outside face and adjacent said tapered body portion (4) in a direction away from said first end, a plurality of longitudinal receiving and locking grooves (10) having inner bottoms (14) which are connected at first ends thereof to said outside face by tapered portions (17), and which have opposite second ends extending into said tapered body portion (4); and wherein said grooves (10) form a locking element for an anti-theft catch (24), are distributed over the body's entire circumference and have a radial depth at least equal to an initial wall thickness of the tubular body; said profiled part (8) forming, on the other hand, in the body's inside face, a plurality of regularly and circumferentially spaced longitudinal projections (16, 36) projecting radially inwardly;

said steering-wheel shaft further comprising two telescopic shaft portions in the form of half-shafts, an outer half-shaft forming the cylindrical body (1) with the profiled part forming the locking element (8), and an inner half-shaft having an outside profile which complements that of an inner face of said locking element.

* * * * *